Feb. 2, 1943.  A. Y. DODGE  2,309,939
UNIVERSAL JOINT
Filed Dec. 9, 1939  2 Sheets-Sheet 1

Inventor:
Adiel Y. Dodge
By
McCanna, Wintercorn & Morsbach
Attys.

Feb. 2, 1943.   A. Y. DODGE   2,309,939
UNIVERSAL JOINT
Filed Dec. 9, 1939   2 Sheets-Sheet 2
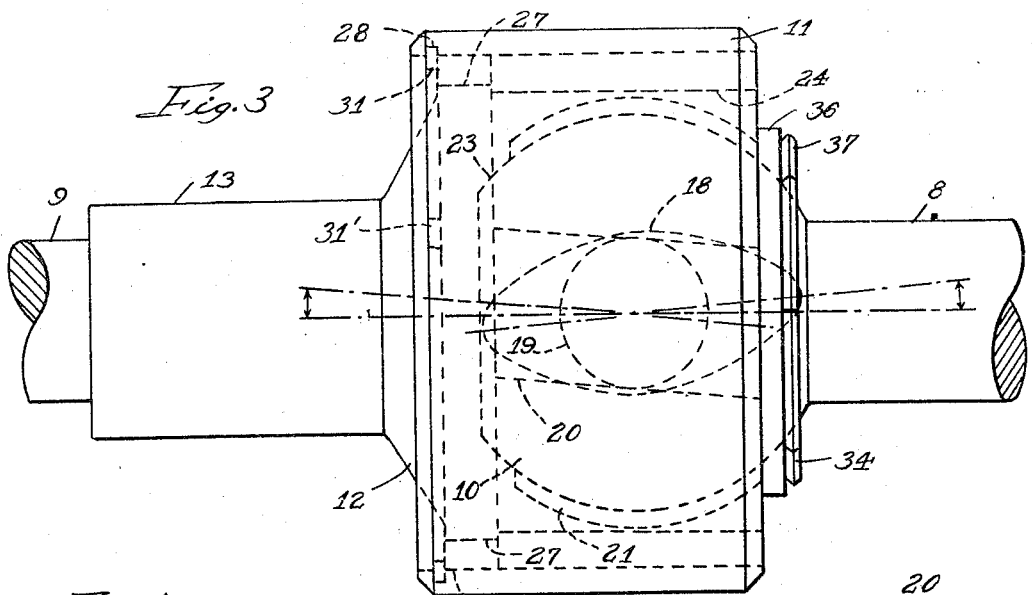
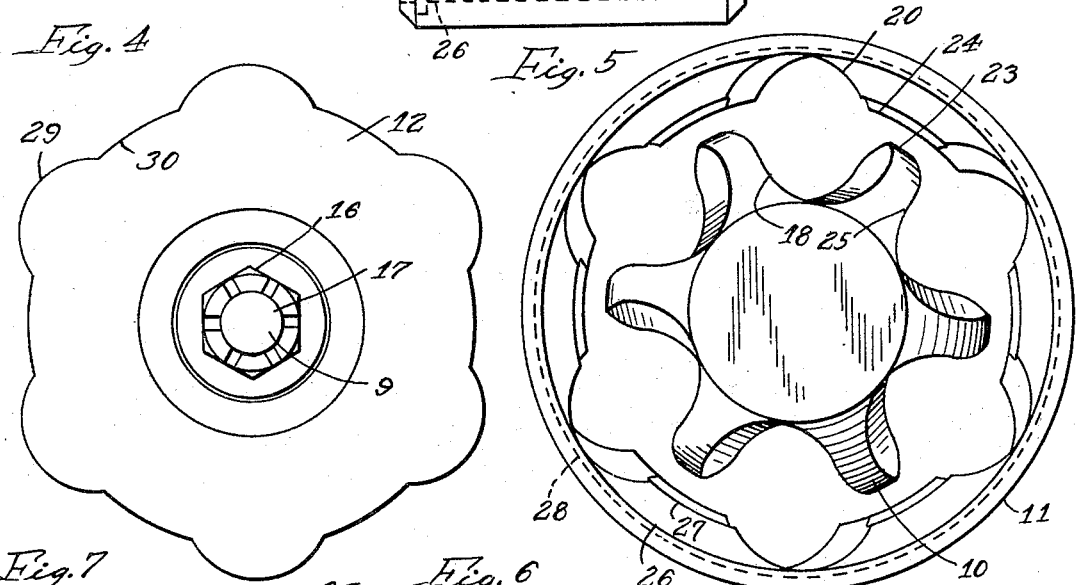
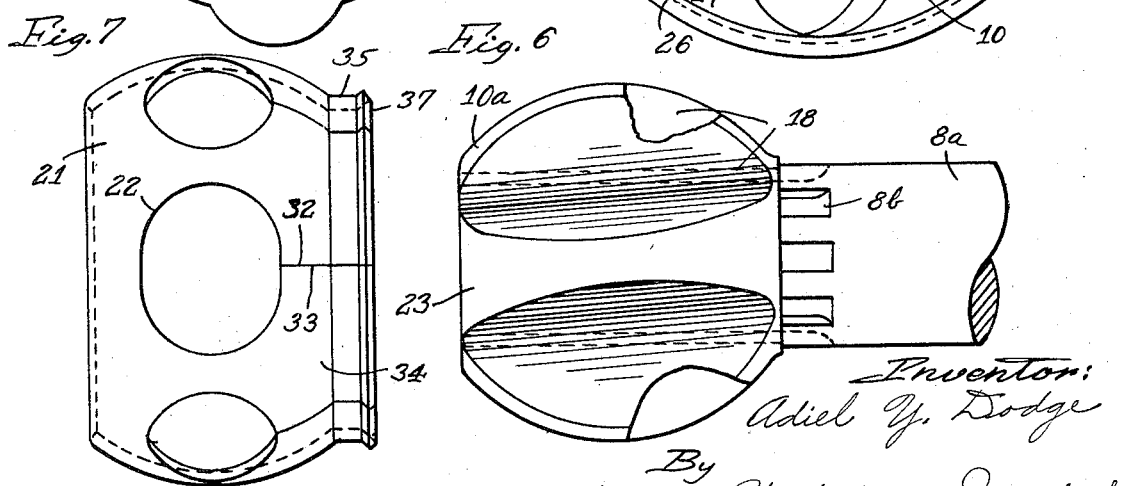
Inventor:
Adiel Y. Dodge
By
McCanna, Wintercorn & Morsbach
Attys.

Patented Feb. 2, 1943

2,309,939

UNITED STATES PATENT OFFICE 2,309,939

UNIVERSAL JOINT

Adiel Y. Dodge, Rockford, Ill.

Application December 9, 1939, Serial No. 308,330

4 Claims. (Cl. 64—21)

This invention relates to a new and improved constant velocity type universal joint.

Universal joints of various designs have been proposed in which the driving and driven elements are interconnected by anti-friction balls working in grooves provided therefor in these elements, but such universal joints have not been adopted to any great extent mainly because of the fact that the grooved elements were invariably not designed to facilitate accurate as well as economical production and such joints could not therefore be produced in competition with others. It is, therefore, the principal object of my invention to provide a universal joint of the kind mentioned in which the ball receiving grooves in the inner and outer elements extend all of the way through at a substantially constant radial distance from the axes of said elements and can, therefore, be broached in one operation and can later be honed readily after hardening.

In universal joints of the kind mentioned it has also been common to provide a ball retainer ring between the grooved driving and driven elements, and in the majority of cases this ring was intended to float in radially spaced relation between the grooved elements and was objectionable because it usually imposed a frictional drag on the balls by reason of becoming slightly eccentric with respect to the grooved elements, there being nothing to keep the retainer ring in exact concentricity with these elements aside from the balls. On the other hand in those few instances where an effort was made to overcome that objection a mistake was made in having the retainer ring brought into full engagement internally and externally with the grooved elements, thus setting up excessive frictional drag upon the operation of the universal joint and causing the parts to wear out prematurely and to develop play to an objectionable degree. It is, therefore, another important object of my invention to provide a universal joint of the kind mentioned in which the ball retainer ring or cage is made to fit the spherical outer periphery of the inner grooved element only, thus assuring its remaining in truly concentric relation with both grooved elements while having light frictional engagement with only the inner element so that there is no appreciable frictional drag set up and consequently little wear and the joint will moreover run quietly and in good balance. The ball cage constitutes the only means for confining the balls to a plane bisecting the angle between the shafts, aside from the action of the balls in the helical grooves.

In constant velocity universal joints having parallel grooves and no cage control the balls bind and prevent angular movement of the shafts, particularly at small angles of displacement. I have avoided that objection by the present combination of the helical grooves and cage wherein the balls roll freely into the bisecting position at all angles of the shafts, including the small angles, and do so without the aid of separate angle bisecting elements.

In carrying out the first object of my invention, the inner element is provided with an enlarged truncated spherical head that is grooved longitudinally helixwise, the grooves being straight or helical and at a substantially constant radius from the axis, and the outer element is made of two main parts, namely, a hollow cylindrical housing part with internal longitudinal grooves extending helixwise from end to end thereof and an attaching part made to fit and be secured in one end of the housing part, the grooves in said housing being also straight or helical and at a substantially constant radius from the axis. In that way the grooves in both elements of the joint can be broached in one operation and later honed readily in one operation after the elements have been hardened.

In carrying out the second object, the spherical ball cage is formed from a single piece of sheet metal, the external shape of which resembles a frustum of a sphere, the cage having ball receiving openings in circumferentially spaced relation in a median plane and the cage being split longitudinally at a plurality of circumferentially spaced points from the middle of one side of each of the openings so as to provide easily radially spreadable portions between which the spherical shaped inner element is adapted to be entered, the split half of the cage being thereafter closed by a ring passed over the circumferentially aligned split edge portions of the cage and suitably secured in place thereon.

The invention is illustrated in the accompanying drawings, in which—

Fig. 3 is a side elevation of the joint indicating in dotted lines one of the balls and the cooperating grooves in the driving and driven elements which are in angular relation to one another intersecting at the ball;

Fig. 4 is an end view of the flange part of the outer grooved element;

Fig. 5 is an end view of the assembly of Fig. 3 with the balls and cage removed and with the flange part shown in Fig. 4 also removed;

Fig. 6 is a side elevation of an inner grooved element similar to that shown in section in Fig. 1 but showing a slight variation in construction, and Fig. 7 is a side elevation of the ball cage minus its ring.

The same reference numerals are applied to corresponding parts throughout the views.

Figure 1:
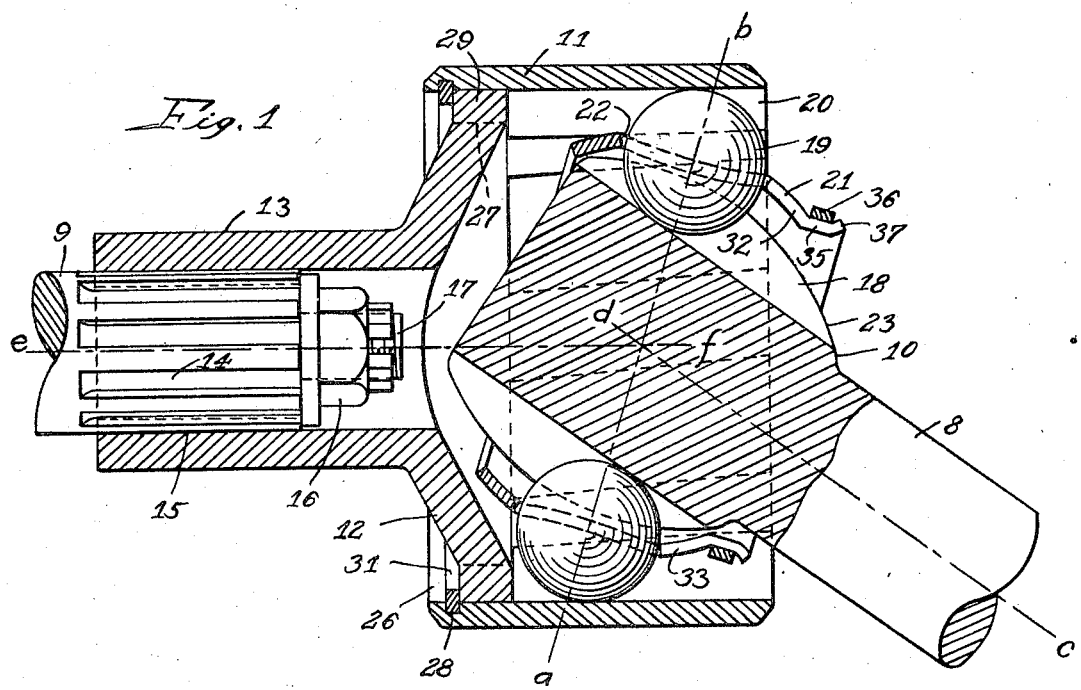
Figs. 1 and 2 are respectively a longitudinal section and a transverse section through a universal joint made in accordance with my invention.
Figure 2:
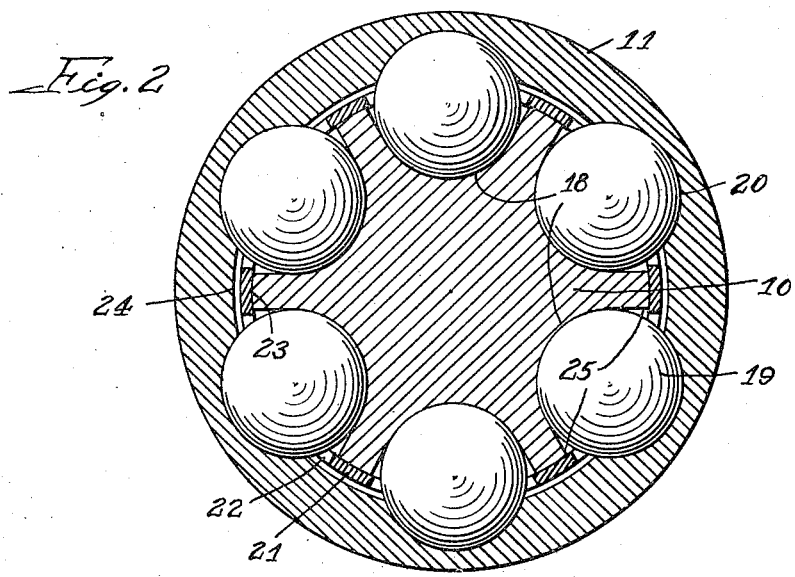

Referring first to Figs. 1 to 3, the numerals 8 and 9 designate two shafts, either of which may be the driving shaft in so far as the universal joint is concerned, but for the purposes of this specification shaft 8 will be considered the driver and shaft 9 the driven shaft. A truncated spherical head 10 is provided on the end of the shaft 8 adapted to operate inside the hollow cylindrical housing 11 that is mounted on the driven shaft 9 by means of the flange 12 on the hub element 13. The latter receives the splined end portion 14 of the shaft 9 in its internally splined portion 15, and a nut 16 is threaded on the reduced end portion 17 of the shaft and holds the parts in assembled relation, such fastenings being common in this art. Circumferentially spaced longitudinal external grooves 18 in the head 10 receive balls 19 which also engage in circumferentially spaced longitudinal internal grooves 20 provided in the housing 11. The grooves 18 extend helixwise and may be straight or helical and are all approximately 5° out of parallel with the axis of the shaft 8, and the grooves 20 also extend helixwise and may be straight or helical and are approximately 5° out of parallel with the axis of the shaft 9, as indicated in Fig. 3, the balls 19 being disposed at their intersections. The grooves 18 are at a substantially constant radial distance from the axis c—d of the shaft 8, and grooves 20 are at a constant radial distance from axis e—f of shaft 9. 21 is a circular cage for the balls 19, this cage having circumferentially spaced openings 22 to accommodate the balls. The cage, in accordance with my invention, is made to a frusto-spherical form to fit the spherical surfaces 23 on the head 10 between the grooves 18. The cage is disposed in radially spaced relation to the cylindrical bore 24 of the housing 11. The openings 22 in the cage are elongated circumferentially with respect to the cage and to the head 10, as indicated in Figs. 2 and 7, but these openings are only wide enough in a longitudinal direction, as indicated in Fig. 1, to afford working clearance for the balls inasmuch as the cage 21 is intended only to retain the balls against displacement from the bisecting plane. The sides 25 of the grooves 18 diverge outwardly and are, as shown, in tangent relation to the balls operating in these grooves. This widening of the grooves 18 results in the balls 19 having very nearly the same extent of line contact in the grooves 18 as they have in the grooves 20 so that the balls may roll with very little scrubbing action. A further advantage of the flared grooves 18 is that lubricant has a better opportunity of working in between the parts and especially between the cage 21 and the head 10 so that frictional drag upon the operation of the joint will be reduced to a minimum. The cage 21, aside from the ball-registering function of the helical grooves 18 and 20, is the only means provided for confining the balls in the plane of the line a—b bisecting the angle formed by the axes c—d and e—f of the shafts 8 and 9 and with the present construction this cage, having bearing contact only on the inner member 10, imposes much less frictional drag upon the operation of the joint than where it has bearing contact internally and externally on both elements of the joint or where it is arranged to float theoretically in radially spaced relation to both elements but has a tendency to set up a binding action on the balls preventing their free rolling action in the correlated grooves of the driving and driven elements. By virtue of the working fit of the cage on one joint element only, the thrust developed during rotation of the joint is transmitted only through points of rolling contact between the balls and their raceways, thereby reducing wear and the possibility of the parts binding. The fact that the balls are kept in the plane a—b bisecting the angle between the shafts 8 and 9 is the thing responsible for constant velocity operation.

Because of the cylindrical character of the outer joint element 11 and the supporting of the cage 21 solely by the spherical head 10, provision is made for freedom of relative axial movement between the joint elements as is desirable for some installations. Such movement is permitted in this instance by spacing the end wall 12 as shown away from the spherical head.

It will be observed that as an incident to flexing of the joint, one raceway swings circumferentially relative to its associated raceway so that, as viewed from the exterior of the joint, the angle of intersection of certain of the pairs of raceways is reduced to parallelism or to less than the locking angle, usually about eight degrees. The balls in raceways thus disposed are positioned by the cage and retained in a plane including all of the other balls. The latter balls, that is, those in raceways intersecting at greater than a locking angle, serve to position the cage. In the present instance and owing to the generally helical character of the raceways, the number of balls acting at any time to position the cage is a maximum and the number of balls being controlled is a minimum. This improvement is due to the fact that with helically extending raceways, the co-acting raceways on one side of the joint converge axially in one direction, as viewed in certain longitudinal sections (see Fig. 1), while the raceways on the opposite side diverge in the same direction. Therefore, even though the angle of crossing of certain pairs of raceways, as viewed externally of the joint, is, by flexing of the joint, reduced below the locking angle, these raceways control the engaged ball in one direction and prevent movement in the direction of convergence. As a result, the cage is called upon to position only those of the balls which are tending to move in the direction of raceway divergence and not controlled by raceways crossing at angles exceeding a locking angle. By thus reducing the number of balls required to be controlled by the cage and correspondingly increasing the number of balls acting to position the cage, the performance of the joint is improved and the cost of manufacture of the joint is reduced.

From the standpoint of economical production of the parts 10 and 11 to the close accuracy desired, I would point out that the grooves 18 and 20 in these parts can easily be machined inasmuch as the grooves 18 are all outside the radius of the shaft 8 and the grooves 20 extend longitudinally through the housing 11. For the same reason each part can be broached in one operation and later honed readily after hardening. The head 10, instead of being integral with the shaft 8, may be provided as a separate part 10a arranged to be suitably secured on the end of the shaft 8a as by being pressed onto the splined portion 8b, the part 10a, of course, being internally splined for that purpose, as indicated.

The housing 11, in accordance with my invention, is counter-bored first on one radius as indicated at 26 and again on a smaller radius as indicated at 27, the counter-bored portion 26 being furthermore internally grooved as at 28. In that way the flange 12 which has circumferentially spaced scallops 29 provided thereon projecting from the circular periphery 30 is adapted to be entered in the counter-bored end of the housing and be retained by a ring 31 split, as at 31', entered in the groove 28, the scallops 29 fitting in the ends of the grooves 20 and the circular periphery 30 fitting in the counter-bore 27, while the ring 31 is entered in the counter-bore 26 and snaps in place in the groove 28, holding the flange 12 tightly in assembled relation to the housing 11 by engagement with the tips of the scallops 29 as clearly appears in Figs. 1 and 3 and, of course, the scallops assume the torque load and transmit drive between the parts 11 and 13 so that there is no relative rotary movement therebetween.

The cage 21 is made from a single piece of sheet metal stamped and formed between dies to the generally frusto-spherical shape shown. Enough metal is cut away at circumferentially spaced points in the blank from which the cage is formed so that there are longitudinal straight edges 32 and 33 which meet at the middle of each of the openings 22 on one side thereof when the cage is finally formed, as illustrated in Fig. 7. Thus I have provided edge portions 34 which are easily spreadable radially to permit entering the head 10 in the cage 21. The edge portions 34 are flanged as at 35 to provide a circumferential rim portion onto which a ring 36 is adapted to be fitted so as to hold the split portion of the cage intact after the head 10 has been entered. The ring 36 may be retained on the rim 35 in any suitable way although I have shown the projecting edge portion 37 of the rim flared outwardly to prevent displacement of said ring.

The cage thus constructed is of a unitary character so that when mounted as above described on the spherical head 10, it is held against axial movement relative to the head even though the cage is out of rubbing contact with the outer joint member. Also, the balls 19, coacting with the intersecting raceways, constitute the sole means for controlling the tilting of the cage relative to the head as a result of which it is unnecessary to employ any means on the outer joint member to engage the cage and control its position on the head.

It is believed the foregoing description conveys a good understanding of the objects and advantages of my invention. The appended claims have been drawn with a view to covering all legitimate modifications and adaptations.

I claim:

1. A universal joint having, in combination, a shaft having a head on one end with circumferentially spaced longitudinally extending ball grooves opening outwardly, a ring enclosing said head and counterbored at one end to provide a shoulder, said ring having internal ball grooves spaced around its interior and extending to the counterbored end past said shoulder, balls fitting in each pair of coacting ring and head grooves, a shaft having a flanged end formed around its periphery with projections complemental in shape to said ring grooves and received in the counterbored ends thereof, and a retainer fitting in the counterbored end of said ring and holding the shaft flange against said shoulder.

2. A universal joint having, in combination, a shaft having a head on one end with circumferentially spaced longitudinally extending ball grooves opening outwardly, a ring enclosing said head and having correspondingly spaced internal ball grooves open at one end of the ring, balls fitting in each pair of head and ring grooves, and a second shaft having projections around its periphery complemental in shape to said ring grooves and received in the open ends of the latter to provide a spline connection between said second shaft and ring.

3. A universal joint having, in combination, a member having a head at one end with a spherical external surface and outwardly opening ball raceways extending generally longitudinally of the member axis, a member enclosing said head and having an internal cylindrical surface and with inwardly opening raceways crossing said first mentioned raceways when said members are axially alined, balls seating in the respective pairs of raceways at the intersections thereof, the raceways in each of said members extending generally helically of the respective members, and a cage of unitary construction having a working fit with said external surface so as to be confined thereby against bodily movement axially of this member and having annularly spaced recesses receiving said balls and engaging the same to position certain of the balls and maintain all of them in a common plane, said cage being out of rubbing contact with said cylindrical surface and being positioned relative to the inner member solely by certain of said balls coacting with their intersecting inner and outer raceways.

4. A universal joint having, in combination, a member having a head at one end with a spherical external surface and outwardly opening ball raceways extending generally longitudinally of the member axis, a member enclosing said head and having an internal cylindrical surface and with inwardly opening raceways crossing said first mentioned raceways when said members are axially alined, balls seating in the respective pairs of raceways at the intersections thereof, the raceways in each of said members extending generally helically of the respective members, and a cage of unitary construction having a working fit with said external surface so as to be confined thereby against bodily movement axially of this member and having annularly spaced recesses receiving said balls and engaging the same to position certain of the balls and maintain all of them in a common plane at all times bisecting the angle between the axes of said members, said cage being out of rubbing contact with said cylindrical surface and being positioned relative to the inner member solely by certain of said balls coacting with their intersecting inner and outer raceways.

ADIEL Y. DODGE.